(12) United States Patent
De Smet et al.

(10) Patent No.: US 11,467,427 B2
(45) Date of Patent: Oct. 11, 2022

(54) CONNECTOR FOR AN OPTICAL DEVICE

(71) Applicant: Morrow N.V., Ghent (BE)

(72) Inventors: Jelle De Smet, Aalst (BE); Paul Wilfried Cecile Marchal, Ghent (BE); Philip Ekkels, Ghent (BE)

(73) Assignee: MORROW N.V., Ghent (BE)

( * ) Notice: Subject to any disclaimer, the term of this patent is extended or adjusted under 35 U.S.C. 154(b) by 0 days.

(21) Appl. No.: 16/766,325

(22) PCT Filed: Nov. 23, 2018

(86) PCT No.: PCT/EP2018/082445
§ 371 (c)(1),
(2) Date: May 22, 2020

(87) PCT Pub. No.: WO2019/101966
PCT Pub. Date: May 31, 2019

(65) Prior Publication Data
US 2020/0371382 A1 Nov. 26, 2020

(30) Foreign Application Priority Data
Nov. 23, 2017 (EP) .................................... 17203363

(51) Int. Cl.
*G02C 7/08* (2006.01)
*G02F 1/29* (2006.01)

(52) U.S. Cl.
CPC .............. *G02C 7/083* (2013.01); *G02F 1/29* (2013.01)

(58) Field of Classification Search
None
See application file for complete search history.

(56) References Cited

U.S. PATENT DOCUMENTS

2003/0214695 A1* 11/2003 Abramson ............ G02F 1/1516
359/265
2009/0303565 A1* 12/2009 Karmhag .............. G02F 1/1533
359/265

(Continued)

FOREIGN PATENT DOCUMENTS

WO  2008013501 A1  1/2008

OTHER PUBLICATIONS

International Searching Authority; notification of transmittal of the international search report and the written opinion of the International Searching Authority, and international search report for international application No. PCT/EP2018/082445; dated Jan. 30, 2019.

(Continued)

*Primary Examiner* — Ryan Crockett
(74) *Attorney, Agent, or Firm* — McDonnell Boehnen Hulbert & Berghoff LLP

(57) ABSTRACT

An optical device (3) comprising a light transmitting electrode layer (2) provided onto a light transmitting carrier (15), wherein a conductive layer (6) is provided on the first electrode layer (2), the conductive layer establishing a connecting area (4), the conductive layer having a thickness being significantly larger than the thickness of the electrode layer (2), and wherein the electrode layer (2) and carrier (15) show a perforation in the connecting area, the perforation being at least partially filled with a conductive material (7) which is further connected to a conductive element (1) thereby establishing an electrical connection between the electrode layer (2) and the conductive element (1) via the conductive layer (6) and the conductive material.

16 Claims, 9 Drawing Sheets

(56) References Cited

U.S. PATENT DOCUMENTS

| | | | |
|---|---|---|---|
| 2010/0225834 A1 | 9/2010 | Li | |
| 2011/0317120 A1* | 12/2011 | Kajiya | G02F 1/13439 |
| | | | 349/149 |
| 2014/0028924 A1* | 1/2014 | Yamaguchi | G03B 17/565 |
| | | | 349/1 |
| 2020/0371382 A1* | 11/2020 | De Smet | G02F 1/1345 |

OTHER PUBLICATIONS

International Searching Authority; written opinion for international application No. PCT/EP2018/082445 dated Jan. 30, 2019.

* cited by examiner

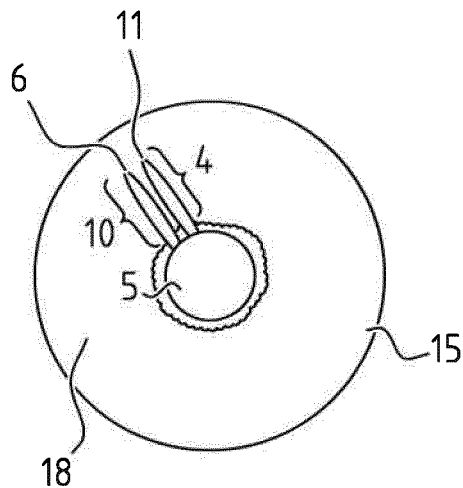
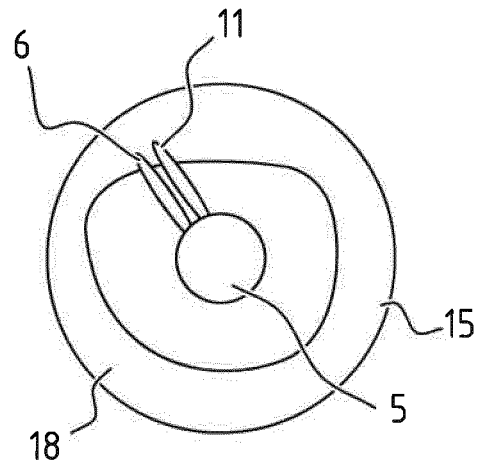
FIG. 4A
FIG. 4B
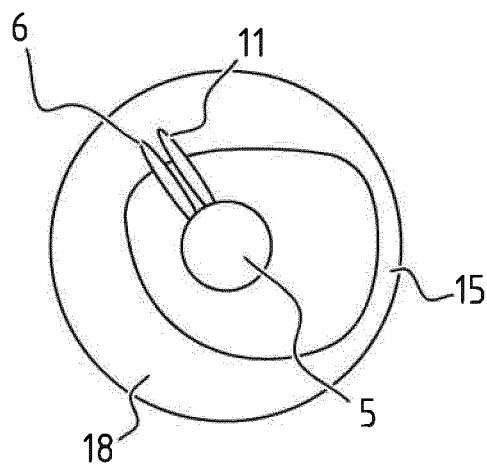
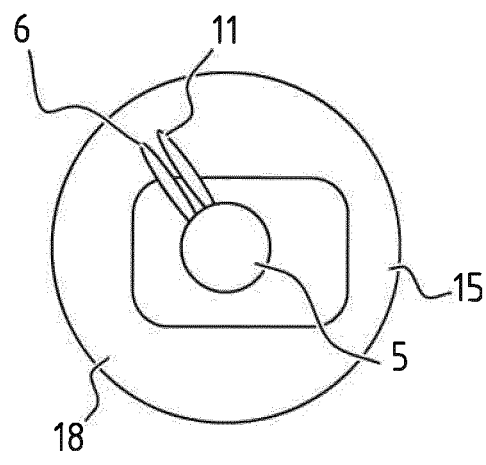
FIG. 4C
FIG. 4D

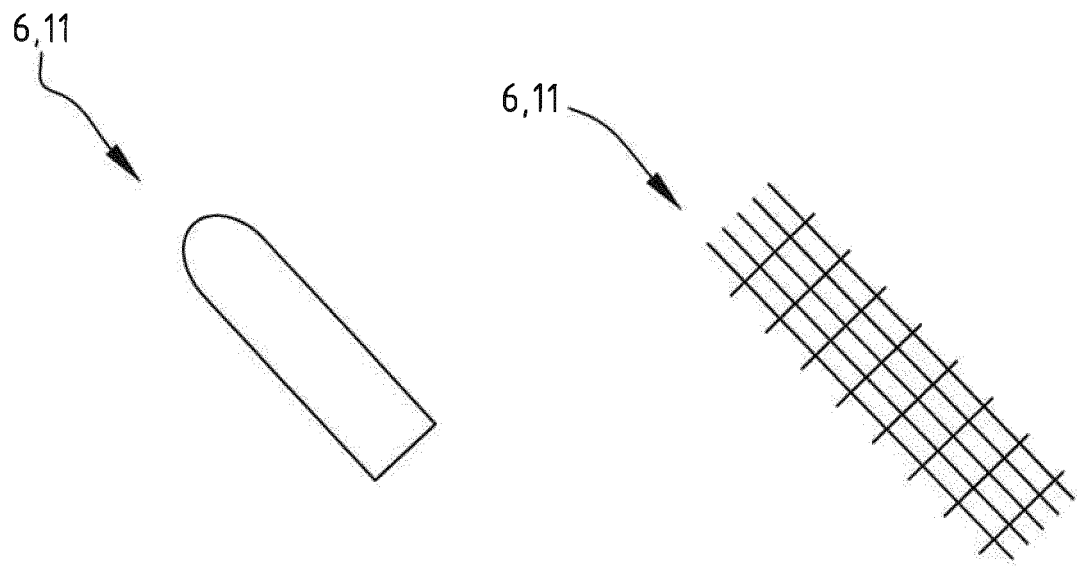
FIG. 5A
FIG. 5B
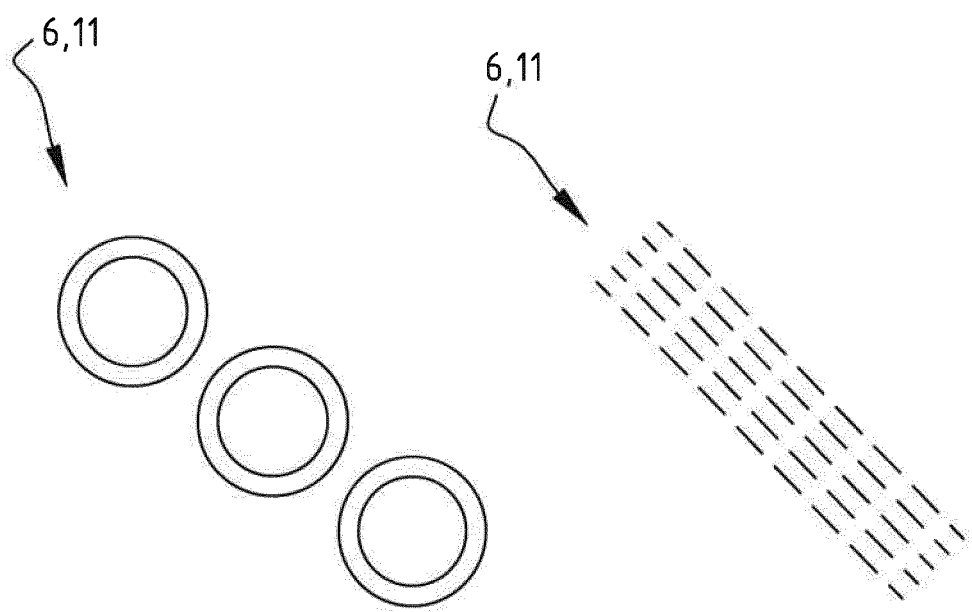
FIG. 5C
FIG. 5D

CONNECTOR FOR AN OPTICAL DEVICE

BACKGROUND

The present invention relates to a method for establishing an electrical connection in an optical device between a conductive element and a light transmitting electrode layer carried by a light transmitting carrier.

US 2010/0225834 describes an adaptive liquid crystal lens system. In this lens system, a transparent substrate is provided as a light transmitting carrier. Onto this light transmitting carrier, a conductive layer is provided. The conductive layer forms the light transmitting electrode layer. The adaptive liquid crystal lens system is used in a pair of glasses for vision correction.

In such optical device, such as. an adaptive liquid crystal lens system, it is advantageous to have an extremely thin electrode layer, as it improves the visual appearance of the optical device and improves the perception of transparency for a user. A drawback of having a thin electrode layer relates to realizing an electrical connection to this layer. In US 2010/0225834, the electrical connection is schematically illustrated and is shown in line with the electrode layers. However, when using extremely thin electrode layers, such connection in line with the layer is practically impossible or at least extremely cumbersome. Therefore, in conventional Liquid Crystal Displays or other adaptive liquid crystal lenses, these thin electrode layers are generally exposed at the side of the device by shifting the carriers they are placed on laterally with respect to one another, allowing an external connector to be fixed on top of the electrode layers. This is illustrated in FIG. 12, wherein the exposed area of the electrode layers are indicated with reference number 21. Since the electrodes are only exposed at the sides of the device, the location for an external connector is only limited to these specific exposed areas.

When one thus desires to integrate an adaptive liquid crystal lens in an optical equipment such as a pair of glasses, the limited locations for placing the external connector greatly reduces the design variations, such as the distance between the connector and the lens, and the position of the lens with respect to the eyeglass frame. Since typical eyeglass users desire to select their preference out of a large set of frames with changing dimensions, and each lens position should be personalized to the user's pupil position for optimal performance, design variations are essential for a commercially viable product. Alternatively, one could manufacture various design variations upfront, but this leads to a large required stock to serve a significant portion of the population.

An additional difficulty, when realizing an electrical connection, is minimizing the visual impact of the connection. In optical equipment such as a pair of glasses, the electrical connection preferably has a minimal visual impact on the device.

It is an object of the present invention to connect the electrode layer in the optical device with a conductive element when the electrode layer is extremely thin, while still allowing for many design variations.

OVERVIEW

To this end the invention proposes a method for establishing an electrical connection in an optical device between a conductive element and a light transmitting electrode layer carried by a light transmitting carrier, the optical device having a connecting area, wherein the method comprises the steps of:
  applying a conductive layer onto the electrode layer in the connecting area, the conductive layer having a thickness being significantly larger than the thickness of the electrode layer;
  perforating the carrier in the connecting area;
  perforating the electrode layer in the connecting area;
  after applying the conductive layer, perforating the conductive layer in the connecting area;
    and wherein the method subsequently comprises the step of:
  at least partially filling the perforation with a conductive material and connecting the conductive element to the conductive material thereby establishing an electric connection between the electrode layer and the conductive element via the conductive layer and the conductive material.

According to the invention, the connection between the electrode layer and the conductive element is realized via the conductive layer and the conductive material, so that two steps can be recognized in the connection forming process of the invention. In a first step, an electrical connection is realized between the electrode layer and a conductive layer. The conductive layer is applied to the electrode layer in a connection area of the optical device. By applying the conductive layer to the electrode layer, a reliable electrical connection can be realized since the surface area where contact is made between the conductive layer and the electrode layer is sufficiently large. Hence, the contact resistance is sufficiently low. In other words, current will flow, in operation in a direction transverse to the electrode layer. The conductive layer has a thickness that is significantly larger than the thickness of the electrode layer. This allows to realize a further electrical connection in a direction parallel to the conductive layer, and more particularly at an interface between the conductive layer and a conductive plug i.e. being a conductive material at least partially filling a perforation. This interface is generated by means of perforating through the conductive layer and subsequent application of the conductive material of the conductive plug. Therefore, in a second step of the connection forming process of the invention, a conductive material is provided in a perforation. The perforation perforates both the carrier and the electrode layer in the connecting area where the conductive layer is applied. As a result, the conductive material realizes a reliable connection with the conductive layer, due to the significantly larger thickness thereof, despite the parallel direction of the connection. It is observed that the term "significantly larger thickness" refers in the context of the present invention, to a thickness ratio between conductive layer and electrode layer of at least 2, such as at least 5, preferably at least 10 or even at least 100. A ratio up to 1,000 is not excluded.

A conductive element can easily be connected to the conductive material at an outer surface of the carrier. In this manner, a reliable electrical connection can be obtained between an external conductive element and an extremely thin electrode layer in the optical device. Using the electrical connection, an external electronic circuit and power source can be connected to the electrode layer for controlling the optical device.

The external conductive element is suitably a conductor of a flexible printed circuit, an electrically conducting wire or the like. The external conductive element may further be or include a connector component, or be an electrode of an electrical component, including switches. The conductive element is typically coupled to a microcontroller, driver or other controller circuit as known per se. An example is for instance a circuit configured for receiving sensing signals from a user interface, such as a button, and converting said sensing signals to controlling signals to the electrode layer. Such controlling signals are for instance embodied as signal pulses of one or more predefined voltages. Where more than one conductive element is present, all such elements may lead to a single microcontroller, driver or other controller circuit. However, it is not excluded that each conductive element extends to a separate controller device or circuit.

It is noted that the invention is defined to allow changing the sequence of at least some steps. The steps of perforating can be combined and simultaneously executed, or can be sequentially executed. The carrier could be perforated before perforation of the conductive layer. Herein, the electrode layer could be perforated with the carrier or with the conductive layer, the latter option being preferred. After the applying of the conductive layer, and after perforating carrier and electrode layer and conductive layer, the conductive material is introduced in the perforation to at least partially fill the latter. Multiple examples will be given in the detailed description of how the different steps in the method can be re-ordered. The term 'at least partially filling' of the perforation is understood in the context of the present invention, that the perforation is not fully filled up with conductive material. For instance, it may extend to a height less than a top surface of the structure into or through which the perforation extends. Alternatively, the conductive material may be applied to side wall(s) of the perforation leaving an inner area void. Furthermore, void areas may be generated due to the filling process, in that part of the material used to fill the perforation would afterwards disappear or be removed.

It is further noted that the carrier is preferably interpreted broadly as the layer directly in contact with the electrode layer, onto which the electrode layer is deposited. In practice, a polymer layer can be provided to carry the electrode layers in the manufacturing process of the adaptive liquid crystal lenses, in which the polymer layer forms the carrier. Alternatively, a transparent inorganic material may be provided as the carrier. In again an alternative implementation, the electrode layer is directly applied to the eyeglass or lens material of a lens system, in which case the eyeglass or lens material forms the carrier. In again a different embodiment, the electrode layer, the conductive layer and any further layer used for the definition of the adaptive liquid crystal lens, may be applied onto a carrier comprising one or more layers. At a further stage of the manufacturing, at least some of the layers of the carrier are then removed and optionally replaced with one or more light transmitting carriers and/or eyeglass or lens material.

In preferred embodiments, an adaptive liquid crystal lens is first manufactured with a polymer layer carrying the electrode layer, which is then integrated in a larger lens system to form the optical equipment by connecting or sandwiching the adaptive liquid crystal lens system to/between eyeglass or lens material.

In a further embodiment, the combination of the polymer layer directly in contact with the electrode layer and the eyeglass or lens material is used as a carrier. In such interpretation, the carrier is extended with the lens or lens halve in which the liquid crystal lens is integrated. Since adaptive liquid crystal lenses, their carriers and the complete optical device can be made out of polymers, perforating either of them can be easily obtained by e.g. drilling, laser cutting, punching or cutting with a sharp tool.

Preferably the optical device has a functional area, and the optical device comprises at least one further light transmitting electrode layer provided at a distance (d) from the first electrode layer in the axial direction of the optical device, and the method further comprises providing an electrical interruption in the at least one further electrode layer between the connecting area and the functional area. The functional area suitably comprises a Fresnel lens and liquid crystalline material. Electrically insulating and optically transparent material is suitably present laterally around the liquid crystalline material. This electrically insulating material preferably extends into the connecting area(s), and being therewith covering the conductive layer and the electrode layer. Preferably this electrically insulating material is used as or comprises spacers defining a distance between the electrode layer and the further electrode layer or further light transmitting carrier. The Fresnel lens is provided onto one of the electrode layer and the further electrode layer. Liquid crystalline material is provided between said Fresnel lens and the other of said electrode layers. The electrically insulating material is present laterally adjacent to said Fresnel lens and said liquid crystalline material and extends to the connecting area and the further connecting area and is perforated while perforating the electrode layers and the conductive layers. For example in an optical device formed as an adaptive liquid crystal lens system, the optical device comprises two electrode layers substantially parallel to each other. Preferably, the electrode layers are each defined on a light transmitting carrier and arranged to face towards each other. In practice, these electrode layers extend close to each other. Because these layers extend close to each other, it is likely that when the first electrode layer is perforated, the second electrode layer is equally perforated. Even when the second electrode layer would not be provided with a conductive layer, it cannot be guaranteed that the conductive material makes no contact at all with the second electrode layer. Therefore, to assure that no electrical connection is realized between the conductive material and the second electrode layer, an electrical interruption is provided in the further electrode layer between the connecting area and the functional area. Due to the electrical interruption, it is guaranteed that the conductive element is isolated from the second electrode layer in the functional area while being connected to the first electrode layer in the functional area. Using this method, a selected one of the electrode layers can be reliably connected to a conductive element external from the optical device while other layers are isolated from this electrical element.

Preferably the optical device has a further connecting area, and method comprises for each of the at least one further electrode layer the further steps:

applying a further conductive layer onto the further electrode layer in the further connecting area, the further conductive layer having a thickness being significantly larger than the thickness of the further electrode layer further perforating the carrier in the further connecting area;

further perforating the further electrode layer in the further connecting area;

providing a further electrical interruption in the electrode layer between the further connecting area and the functional area;

and wherein the method subsequently comprises the step of:

at least partially filling the further perforation with a further conductive material and connecting a further conductive element to the further conductive material thereby establishing an electric connection between the further electrode layer and the further conductive element via the further conductive layer and the further conductive material.

The mechanism to connect the second layer to the second conductive element is similar to the above described method to connect the first electrode layer to the first connecting element. According to the preferred method, two electrode layers can be independently connected to respective conductive elements, even when the electrode layers are extremely thin and even when the electrode layers lay physically close to each other. Such connection allows an electronic circuit and a power source to control the voltage between the electrode layers. Preferably the further connecting area is located adjacent to the connecting area, and the further connecting area shows no overlap with the connecting area.

The electrical interruption may be obtained either during the application of the electrode layer or thereafter. Techniques for patterned application of the electrode layer include printing, patterned deposition using a resist, and electrodeposition on an underlying template, such as by means of electroless deposition and/or electroplating. Techniques for removal of part of a deposited layer include for instance etching, punching, cutting. In one embodiment, the electrical interruption is obtained by cutting away the further electrode layer in the connecting area, and the further electrical interruption is obtained by cutting away the electrode layer in the further connecting area. The visual impact of the cutaway is negligible since the other electrode layer is provided with a connecting surface in the same area. Cutting away the electrode layer is highly effective since it takes away the possibility to realize an unwanted connection with that layer in that area.

Preferably the conductive layer is applied in according to a pattern, that is with limited extension. For instance, the lateral extension of the conductive layer may be set so that a surface area of the conductive layer is at least twice the surface area of the perforation applied thereafter. Preferably, the conductive layer has a diameter (in a plane parallel to the underlying carrier) that is at least twice the diameter of the perforation. In case that the conductive layer and/or the perforation would have a circular surface area, the diameter refers to the shortest diameter. Therewith a tolerance area is generated so as to overcome any misalignment of the perforation step. It will be understood that the diameter of the conductive layer could even be larger than twice the diameter of the perforation, for instance at least four times as large, at least five times as large, so as to match the level of accuracy in the alignment of the perforation.

The conductive layer can be applied by any suitable deposition technique that does not damage any underlying layer, including for instance electroplating, screen printing, the application of solder paste, the application of an electrically conductive adhesive, including for instance silver pastes or any other material comprising an electrically conductive filler. However, the generation of a rather homogeneous layer is preferred so as to maximize the conductive surface area with the conductive material applied in the perforation.

In a preferred embodiment, the method further comprises the step of assembling the carrier, the electrode layer and the conductive layer with a further light transmitting carrier, a further electrode layer on the further light transmitting carrier and one or more intermediate layers on at least one of the carriers, before the provision of the perforation and optionally the further perforation.

The intermediate layers may comprise a Fresnel lens, a liquid crystalline material; and electrically insulating material, wherein the Fresnel lens may be provided onto one of the electrode layer and the further electrode layer, wherein the liquid crystalline material may be provided between said Fresnel lens and the other of said electrode layers, said Fresnel lens and said liquid crystalline material may be present in the functional area, and wherein the electrically insulating material may be present laterally adjacent to said Fresnel lens and said liquid crystalline material, which electrically insulating material may be extending to the connecting area and may be perforated while perforating the electrode layers and the conductive layers.

This means that the carrier, the electrode layer and the conductive layer are only perforated after being assembled. Due to its significantly larger thickness, the conductive layer is in practice easily visually recognizable. Therefore the location where to perforate can be detected after assembly.

Preferably the method further successively comprises after the step of assembling, simultaneously perforating the carrier, the electrode layer and the conductive layer in the connecting area. In this manner, the perforation can be done at once. In order to prevent misalignment of the perforation relative to a location of the conductive layer, the conductive layer preferably has a width larger than the intended diameter of the perforation. To establish a reliable electrical connection, it is required that the perforation at least partly perforates the conductive layer. By providing the conductive layer according to a pattern, an operator can choose where to perforate the optical device, as long as the perforation at least partially perforates the patterned conductive layer.

In order to limit visibility of a conductor layer with a large surface area, it is feasible to subdivide such conductor layer into a plurality of conductor patterns. Herein, the conductor layer is provided pattern wise, including a plurality of conductor patterns within the connection area, wherein said plurality of conductor patterns covers a surface area at least three, preferably at least four times as large as a surface area of a perforation. The conductor patterns are for instance elongated strips, with a length of for instance 0.5 micron and a width of 0.1 micron. When a plurality of such patterns is put next to and behind each other, a larger surface area can be filled. Upon making a perforation within such larger surface area, at least some of said conductor patterns will be partially removed. This ultimately will result in the creation of interfaces between such conductor pattern and the conductive plug, i.e. the conductive material filling the perforation. As will be understood, in this embodiment, each of the conductor patterns will be connected to the underlying electrode layer. As will be further understood, the design of the conductor patterns may be varied and some feasible patterns are shown in FIGS. 5B and 5D.

In a further embodiment, the optical device is provided with a plurality of connecting areas, all connected to the electrode layer, and/or with a plurality of further connection areas connected to the further electrode layer. Alternatively, the connecting area and further connecting area have an elongated shape.

All the embodiments discussed (a plurality of conductor patterns, a series of separate connection areas each with a conductor layer and an elongate conductor) facilitate standardization of the manufacture of the optical device for a variety of optical equipment, such as pairs of glasses with different dimensions. Since there is a plurality of locations for a perforation, the location may be chosen in at an advanced stage of manufacturing. This gives a freedom to the operator to integrate the optical device in a larger system, for example a pair of glasses, while having a pre-determined freedom regarding the location of connection of the electrode layers. Furthermore, it is noted that the design freedom for integrating an optical device in for example a pair of glasses is significantly improved by connecting the optical device via a perforation. It will be clear that a connection realized at an edge of the optical device would inevitably limit the design freedom.

In an alternative embodiment, the carrier is perforated and/or the further light transmitting carrier is provided with wells or perforations, prior to the assembly, and preferably prior to the application of the respective electrode layer and conductive layer. In this embodiment, the location of a perforation is visible, which minimizes alignment issues. Moreover, due to the presence of perforations in the carriers, the remaining perforation steps are minimized and can be carried out efficiently, and with techniques allowing the manufacture of narrow perforations. An example thereof is wet-chemical or dry etching, or the use of needles. It is observed for clarity that particularly in this embodiment, it is feasible that one of the carriers is merely provided with a well rather than a perforation, wherein a well is a recess in a carrier that does only partially, i.e. not fully, extend through a carrier in the axial direction thereof. The overall generation of a perforation "with a bottom", i.e. a trench is deemed an interesting option to facilitate the deposition of—electrically—conductive material.

In again a further embodiment, the step of connecting a conductive element to the conductive material comprises the steps of sandwiching the generated system of carrier, any further light transmitting carrier, one or more electrode layers, conductive layers and intermediate layers between transparent bodies, providing holes through at least one of the transparent bodies and the system sandwiched in between thereof, said holes being aligned with the filled perforations and having a smaller diameter, applying auxiliary conductive material into the generated holes and connecting the conductive element to such auxiliary conductive material at an outside of such transparent body. In other words, the auxiliary conductive material is provided in a bore created inside the conductive material. This auxiliary conductive material however extends further, typically to outside the hole, facilitating a connection to the conductive element. If the conductive material would not fill up the perforation, any remaining void can filled up in this step. In order to facilitate the connection to the conductive element, means may be provided on the outside of the one or more transparent bodies, such as a well in which the auxiliary conductive material may extend. The auxiliary transparent material is for instance an electrically conductive glue, but can also be another type of conductive material.

Rather than providing a vertical connection to the conductive plug (thus the at least partially filled perforation), it is feasible to apply a lateral connection. The latter is deemed to be advantageous, so as to minimize risks of contamination via the additional hole and auxiliary conductive material. In this alternative embodiment, a hole is provided sidewise in a manner to end up at the conductive plug. Due to its size, for instance with a diameter of 0.2-2 mm, such as 0.5-1.3 mm and a height of 100-300 microns, any hole can be easily aligned with the conductive plug. Moreover, the conductive plug provides a uniform surface to which auxiliary conductive material can be applied and bonded. Such lateral connections are preferably applied after sandwiching the optical device between two transparent bodies such as lens halves.

The invention further relates to an optical device comprising a light transmitting electrode layer provided onto a light transmitting carrier, wherein a conductive layer is provided on the first electrode layer, the conductive layer establishing a connecting area, the conductive layer having a thickness being significantly larger than the thickness of the electrode layer, and wherein the electrode layer and carrier show a perforation in the connecting area, the perforation being at least partially filled with a conductive material which is further connected to a conductive element thereby establishing an electrical connection between the electrode layer and the conductive element via the conductive layer and the conductive material.

In the optical device of the invention, the electrode layer is connected to the conductive element, for example a wire, via a perforation in the optical device. This perforation extends transverse to the optical device and transverse to the electrode layer. Since electrode layers, in practice, can be extremely thin, a reliable electrical connection is realized by first providing a conductive layer onto the electrode layer. The conductive layer has a thickness that is significantly larger than the thickness of the electrical layer. This allows to obtain a reliable connection wherein two steps can be recognized. In a first step, connection is realized between the conductive material filling the perforation and the conductive layer which is applied to the electrode layer. In a second step, a reliable electrical connection is realized between the conductive layer and the electrode layer. Hence, a reliable electrical connection is realized between the conductive element, via the conductive material and via the conductive layer, with the electric layer.

Manufacturing of the optical device, and integrating the optical device into a larger structure, such as a pair of glasses, can be standardized while increasing the design freedom for the integrator of the optical device. The integrator of the optical device is not bound to connect the optical device with an edge to a further conductive element so that the edges of the optical device can be freely manipulated. Furthermore, depending on how the conductive layer is applied to the electrode layer, freedom is given to the integrator to choose the location of perforation.

Preferably at least one further light transmitting electrode layer is provided in the optical device at a distance from the electrode layer, the at least one further electrode layer being provided with an electrical interruption between the connecting area and a functional area. As explained above in relation to the method of the invention, providing a further or second electrode layer allows creating, for example, an adaptive liquid crystal lens system. The electrical interruption ensures that the conductive material only electrically connects to the first electrode layer, and not to the second or further electrode layers.

Preferably, a further conductive layer is provided on the further electrode layer, the further conductive layer establishing a further connecting area, the further conductive layer having a thickness being significantly larger than the thickness of the further electrode layer, and wherein the further electrode layer and carrier show a further perforation in the further connecting area, the further perforation being at least partially filled with a further conductive material which is further connected to a further conductive element thereby establishing a further electrical connection between the further electrode layer and the further conductive element via the further conductive layer and the further conductive material.

In the preferred optical device, the first electrode layer is connected to a first conductive element in a reliable way, as explained above. The further or second electrode layer is connected to a further or second conductive element in a similar, reliable way. This allows to connect the first and second electrode layer to an electronic circuit and a power source so that a voltage can be controlled between the electrode layers. In this manner, the optical device can be operated. The advantages of efficient manufacturing and improved design freedom are equally maintained when the two electrode layers are connected to respective conductive elements.

Preferably the conductive layer and further conductive layer have a lateral extension such that its surface area is at least twice as large as the cross-sectional area of the perforation. By further preference, the diameter of the conductive layer(s) are at least twice the diameter of the perforation. In this context, the surface is defined as the total area where a perforation can be made in order to establish a connection, via the patterned conductive surface, with the electrode layer. According to this definition, the surface extends over a larger area than the conductive layer since a connection can be realized when the conductive layer is only partly perforated, for example on a side edge of the conductive layer. Also according to this embodiment, the surface area of the conductive layer can be significantly smaller than the surface area where a connection can be realized, for example when the pattern is formed by one or a number of thin lines. Particularly when the perforation is made in the carrier device, electrode layer and conductive layer after these elements have been assembled, a freedom is given to the integrator of the optical device in a larger structure to choose where the perforation is made. The perforation can be made over the entire conductive layer and also at edges of the conductive layer. To obtain a reliable electrical connection, the perforation should at least partially perforate the conductive layer.

BRIEF DESCRIPTION OF THE DRAWINGS

Any features discussed in the foregoing and/or in the claims relating to the method are also applicable to the resulting optical device. The invention will now be described in more details with respect to the drawings illustrating some preferred embodiments of the invention. In the drawings:

FIGS. 4A 4B, 4C, and 4D illustrate a frontal view of the second embodiment of the invention, showing how the integration into a larger structure is flexible;

FIGS. 5A, 5B, 5C, and 5D) illustrate multiple patterns of the connecting surface;

In the drawings a same reference number has been allocated to a same or analogous element.

DETAILED DESCRIPTION

Figure 1:
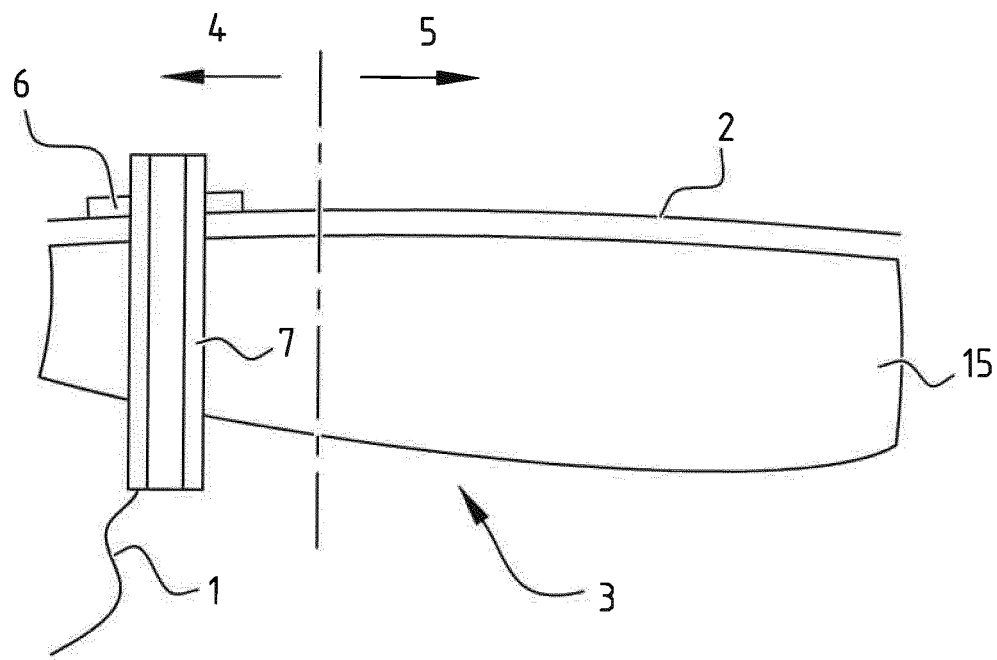
FIG. 1 illustrates a cross section of a first embodiment of the invention.
Figure 2:
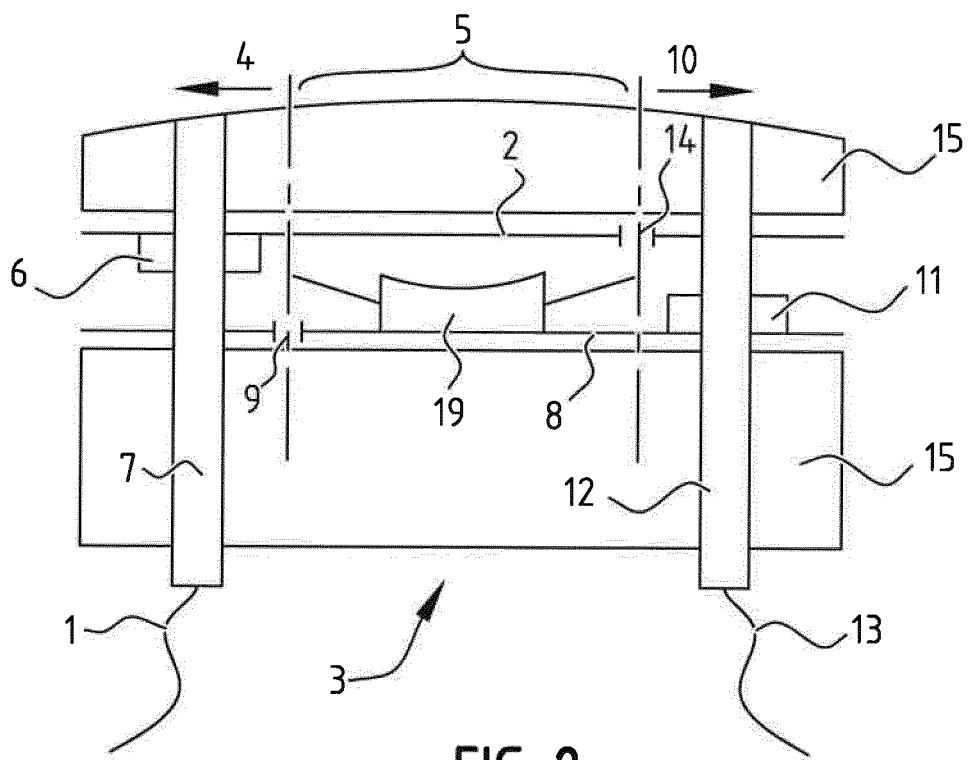
FIG. 2 illustrates a cross section of a second embodiment of the invention.

FIG. 1 illustrates an electrode layer 2 on a carrier 15. The carrier 15 is light transmitting and is preferably formed as a polymer layer or sheet that is used in the manufacturing process for supporting the electrode layer. Alternatively, the carrier 15 is formed as a lens or at least part of a lens. In this context, it is noted that the electrode layer 2 may be directly applied to the lens or part of a lens. Alternatively, the electrode layer 2 may be first manufactured onto a polymer sheet, which is then applied to the lens or part of a lens together with the polymer sheet. In such situation, the carrier is extended and can be defined as the polymer sheet in combination with the lens or part of the lens. The lens can be integrated in a larger structure, for example in a pair of glasses or in a lens system of a camera or in another lens system. The carrier 15 can be formed in one part, referred to as (single) carrier, or in multiple parts, referred to as extended carrier. The carrier 15 can be made of glass or plastic. The technique of extending the carrier 15 may be used to sandwich multiple electrode layers, together forming an optical device, between two glass or plastic parts thereby integrating the optical device in a larger lens structure. The embodiment in FIG. 2 shows such situation.

The electrode layer 2 is supported by the carrier 15. The electrode layer 2 can be connected to, for example glued to or otherwise attached to, the carrier 15. The electrode layer 2 is extremely thin and in practice may have a thickness of about 100 nm. To connect the electrode layer 2 to an external conductive element 1, a conductive layer 6 is applied to the electrode layer 2. A perforation is made in the carrier and in the electrode layer and in the conductive layer 6. A conductive material 7 at least partially extends through the perforation. The conductive material 7 can be connected to the conductive element 1 thereby interconnecting, via the conductive layer 6, the electrode layer 2 with the conductive element 1. The conductive material 7 can be formed by a liquid applied material, which cures in the perforation after application. Alternatively, the conductive material can be formed by a pin or a rivet or other element that can be pushed or clamped or otherwise forced into the perforation to establish the connection. In case the conductive material is formed by a pin, rivet or other element, the latter could be hollow.

The electrode layer 2 and carrier 15 together form the optical device 3. In the optical device 3 a connecting area 4 and a functional area 5 can be distinguished. The connecting area 4 and functional area 5 may have highly similar properties and structures without a clear border between the areas 4 and 5. The connecting area 4 and functional area 5 may be physically separate or may alternatively be distinguished only by their intended function. In the connecting area 4, the connection between the conductive element 1 and the electrode layer 2 is realized. This electrical connection requires at least some elements to be present that disturb the transparency of the optical device 3. Namely, the conductive layer 6 is typically not transparent. Also the conductive material 7 filling the perforation in the carrier and electrode layer is typically not transparent. The electrode layer 2 is integrally formed in both areas 4 and 5 so that a single electrode layer 2 can be connected in the connecting area 4 and can perform its function in the functional area 5.

In the functional area 5 of the optical device 3, the transparency is optimized due to the minimization of influence of visually disturbing elements. In this functional area 5, the electrode layer 2 can be powered so that the electrode layer 2 can perform its function. An example of this function is described further in this description and preferably relates to a controllable Fresnel lens wherein the lens function can be activated or deactivated using liquid crystal technology. Alternatively, electronic components can be connected to the electrode layer to perform one or more predetermined functions in the functional area 5. Examples or such components are LEDs that can be switched on and off.

FIG. 2 illustrates an optical device 3 according to a preferred embodiment of the invention. In the optical device 3 of FIG. 2, a liquid crystal lens system is sandwiched between two carriers 15. The liquid crystal lens system comprises an electrode layer 2 and a further electrode layer 8 provided at a distance between each other. In a functional area 5, a Fresnel lens 19 is arranged between the electrode layer 2 and the further electrode layer 8. The Fresnel lens 19 is in the embodiment of FIG. 2 provided adjacent to the further electrode layer 8. Between the electrode layer 2 and the Fresnel lens 19, liquid crystals are provided. The Fresnel lens, liquid crystals and electrode layers 2, 8 are provided such that by powering and depowering the liquid crystals, the Fresnel lens 19 can be activated or deactivated. In this manner, a switchable lens system is obtained.

In the optical device of FIG. 2, a connecting area 4 is provided wherein the electrode layer 2 is connected to a conductive element 1. The basic principles for connecting the electrode layer 2 and the conductive element 1 are the same as described above in relation to FIG. 1. In the embodiment of FIG. 2, the perforation and the conductive material 7 not only extend through the electrode layer 2, but also extend though the further electrode layer 8. Although in the connecting area 4, only the electrode layer is provided with a conductive layer, it cannot be excluded that an electrical connection is realized between the conductive material 7 and the further electrode layer 8. To ensure that no unwanted connection is realized, an electrical interruption 9 is provided between the connecting area 4 and the functional area 5 in the further electrode layer. This interruption 9 ensures that even if the conductive material 7 would make contact with the further electrode layer 8, which is unlikely due to the further electrode layer 8 being extremely thin, there is no connection between the conductive material 7 and the further electrode layer 8 in the functional area 5.

The connecting area 4 in which the electrode layer 2 is connected to a conductive element 1, is shown on the left-hand side of the figure. On the right-hand side of the figure a highly similar connection is shown, interconnecting the further electrode layer 8 with a further conductive element 13. This further connection is realized using the same techniques as described above. In particular, a further conductive layer 11 is provided against the further electrode layer 8. The carrier 15 and the further electrode layer 8 and the further conductive layer 11 are perforated and a further conductive material 12 at least partially fills the perforation. The further conductive element 13 can be connected to the further conductive material 12. The further conductive material 12 interconnects with the further conductive layer 11, which in its turn connects to the further electrode layer 8. In this manner, the further electrode layer 8 is connected to the further conductive element 13 via the further conductive material 12 and the further conductive layer 11. To ensure that no electrical connection is realized between the further conductive material and the electrode layer 2, a further electrical interruption 14 is provided between the functional area 5 and the further connecting area 10. In the embodiment of FIG. 2 a functional area is shown, and two connecting areas 4 and 10 are shown. In the embodiment of FIG. 2, the functional area 5 is formed in between the connecting areas 4, 10. However, the skilled person will realize that the connecting areas can be freely arranged in the optical device 3 as beneficial for the application.

Based on the description above, a skilled person could add yet further electrode layers, arriving at an optical device comprising a stack of electrode layers each of which is connected with a distinct conductive element.

Figure 3:
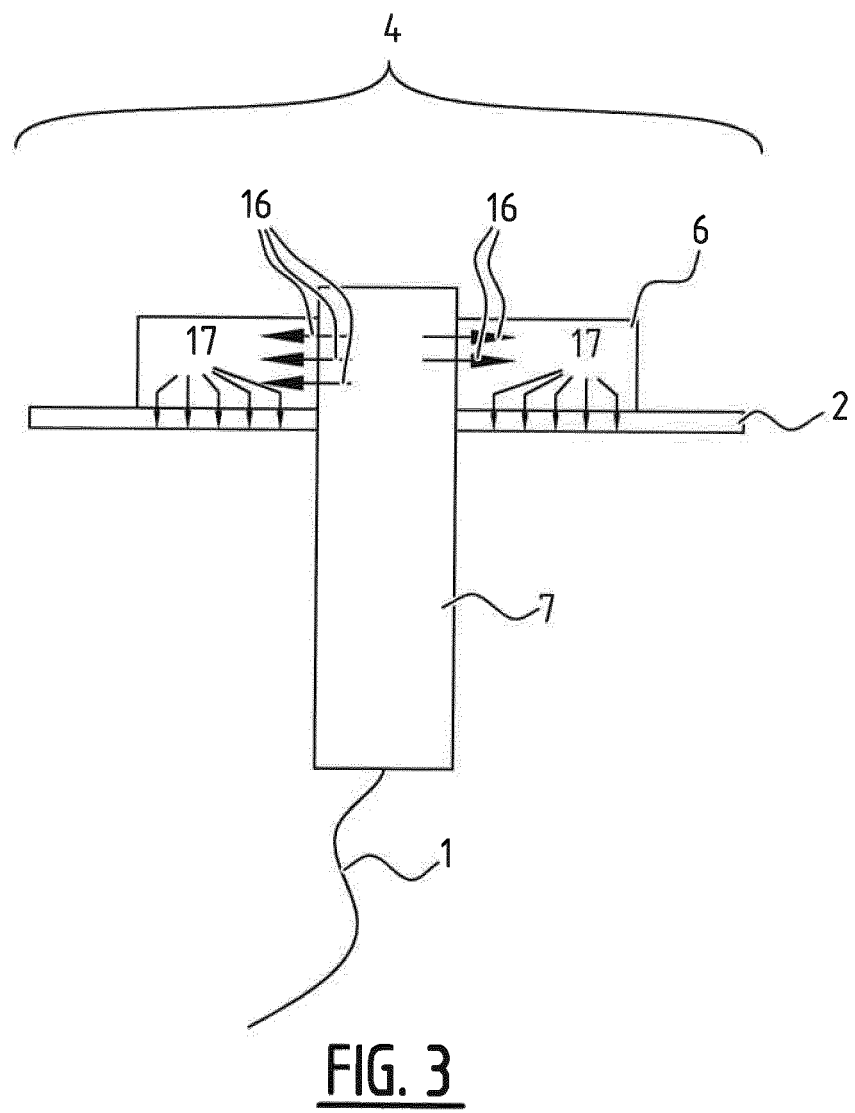
FIG. 3 illustrates the steps in the electrical connection.

FIG. 3 illustrates how the electrical connection between the conductive element 1 and the electrode layer 2 is realized. The conductive material 7 at least partially fills a perforation of the optical device 3. The perforation typically extends transverse to the carrier 15 and the electrode layer 2. Since the conductive material 7 extends transverse to the electrode layer, only a very thin slice of the circumference of the conductive material 7 lays directly in line with the electrode layer 2. Tests have revealed that obtaining a reliable electrical connection directly between the electrode layer 2 and the conductive material 7 in a manufacturing setting is very difficult. To obtain the reliable connection, the conductive layer 6 is applied to the electrode layer 2. The conductive layer can be for example formed by a silver ink, which is known for its good conductive properties. Such ink can be printed onto the electrode layer without damaging the layer. In the context of optical devices, particularly lenses, it is noted that these lenses are typically made of a plastic material and cannot withstand high temperatures. In other words, the carrier in the invention is typically made of a plastic material which cannot withstand high temperatures.

The thickness of the conductive layer 6 is significantly larger than the thickness of the electrode layer. The conductive layer for example has a thickness higher than 0.5 micron, preferably higher than 1 micron, more preferably higher than 5 micron and has a thickness smaller than 50 micron, preferably smaller than 40 micron more preferably smaller than 30 micron. Most preferably, the conductive layer has a thickness of about 10 micron. The electrical connection between the conductive element 1 and the electrode layer 2 is realized via the conductive layer 6. In this electrical connection 6, two steps can be recognized. In a first step 16, an electrical connection between the conductive material 7 and the conductive layer 6 is realized. In a second step 17, an electrical connection between the conductive layer and the electrode layer is realized. It will be clear that a two-step connection is a simplified theoretical explanation of the electrical connection. From this explanation, it is clear that the conductive layer may be partially perforated or perforated at an edge of the conductive layer so that the conductive material 7 only touches the conductive layer along a part of its circumference.

FIG. 4 an optical device 3 with a larger carrier 15 that is adapted for integration into a larger structure. Furthermore, in FIG. 4, it is illustrated how the connecting area 4 and the further connecting area 10 are positioned with respect to the functional area 5. The conductive layer 6 and the further conductive layer 11 in the embodiment of FIG. 4 have an elongated shape. This shape extends from the functional area 5 towards an edge of the carrier 15. The conductive layer 6 and the further conductive layer 11 extend substantially parallel to each other. The functional area 5 is provided in a center part of the carrier. This set-up has significant advantages when integrating the carrier 15 into a larger structure. The elongated connecting areas give a design freedom to the integrator to choose where to perforate the carrier. The perforation can be made anywhere along the conductive layer 6 and further conductive layer 11. As long as the perforation at least partially perforates the conductive layer 6, 11, a connection can be realized.

The set-up of FIG. 4A creates a carrier manipulation zone 18 around the functional area 5 in which the carrier 15 can be cut. This allows the carrier of FIG. 4 to be integrated in a pair of glasses having a large frame, as well as in a pair of glasses having a small frame. This allows standardizing the manufacturing process for the optical device. Upon integration, the standard optical device is customized depending on the larger structure. This enhances the design freedom as well as it optimizes the manufacturing of the optical device 3. FIGS. 4B and 4C illustrate how the carrier manipulation zone 18 provides freedom relating to the final location in the pair of glasses where the functional area 5 of the liquid crystal lens system is positioned. FIG. 4D illustrates how the carrier manipulation zone 18 further allows integrating the liquid crystal lens system into a pair of glasses having a different form. Based on these examples, it will be clear that this set-up gives a design freedom when integrating the lens into a larger structure.

FIG. 5 shows multiple patterns for the conductive layer 6/11. In FIG. 5A, a straight and continuous layer is provided. When the conductive material is silver ink, it is not possible to see through the layer of FIG. 5A, and therefore the visual impact of the conductive layer is high. FIGS. 5B, 5C and 5D show alternative patterns which are formed as discontinuous layers so that it remains possible to at least partially see through the conductive layer 6. In FIG. 5B, the conductive layer is formed as a grid. In FIG. 5C, the conductive layer is formed as a number of adjacent rings. Thereby, the rings are designed with an inner diameter that is smaller than the perforation diameter and an outer diameter that is larger than the perforation diameter. It is noted that it is not necessary to perforate exactly in or on a ring, but that it is also possible to perforate in between two rings. In FIG. 5D, a pattern of short lines is provided. Each one of these patterns allows realizing a reliable electrical connection, and facilitates a two-step connection that is described in relation to FIG. 3. The electrical connection between the conductive layer 6/11 and the conductive material 7/12 will, when a conductive layer of FIG. 5B, 5C or 5D is used, be significantly smaller compared to the continuous layer of FIG. 5A. The connection cannot be realized continuous along the periphery of the conductive material 7/12. However, tests have shown that such pattern is sufficient to realize a reliable connection.

FIGS. 6-9 show different embodiments of the method to manufacture the optical device 3 of FIGS. 2 and 3. In step 1, the electrode layer 2, 8 is provided. This electrode layer is practice, to allow manipulation of the extremely thin layer, provided on a transparent sheet. The transparent sheet forms the carrier. Onto the electrode layer 2, 8, a conductive layer 6/11 is applied. This conductive layer is preferably applied by printing. Furthermore, an electrical interruption 9/14 is created in step 3.

In step 4, two electrode layers with the conductive layers and the electrical interruptions are assembled with a Fresnel lens 19 in between. During assembling, alignment of the electrode layers 2, 8 is important to ensure that the conductive layer 6 of the electrode layer is aligned with the electrical interruption 9 of the further electrode layer 8. Equally, the conductive layer 11 on the further electrode layer 8 is aligned with the electrical interruption 14 of the electrode layer 2. In step 4, the liquid crystal lens system is formed. This liquid crystal lens system is preferably formed as a foil. In step 5, this foil is integrated between two lens halves, thereby extending the carrier 15. Step 5 could be performed at a remote facility, for example by an optician.

In step 6, the carriers are perforated so that a hole 20 is formed. The hole 20 extends substantially transverse to the carrier and electrode layers. The hole 20 is situated at the conductive layers 6, 11 to at least partially perforate these conductive layers 6, 11. In step 7, the holes 20 are at least partially filled with conductive material 7/12 thereby also connecting the external conductive element 1, 13 (not shown in FIGS. 6-8).

Figure 7:
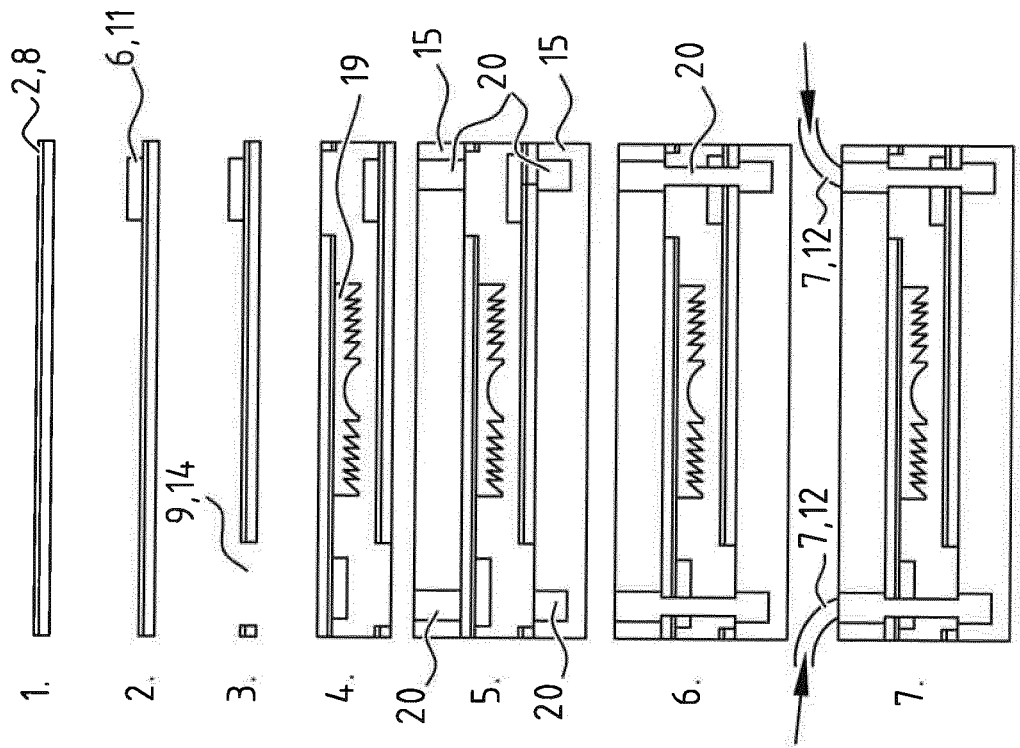
FIGS. 6, 7, 8, and 9 illustrate different embodiments of the method of the invention.
Figure 6:
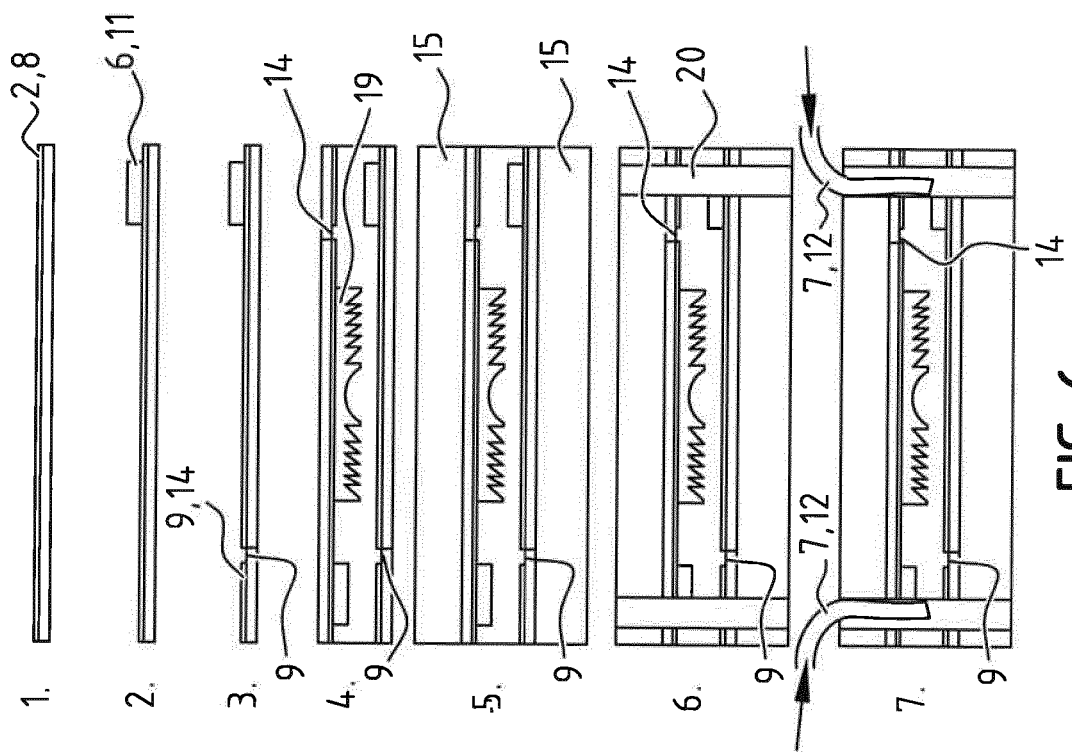

FIG. 7 shows an alternative method that largely corresponds to the method of FIG. 6, but wherein the carrier 15 is perforated in two steps. In step 5, the electrode layers are sandwiched between extending parts of the carriers 15 which are pre-perforated. In this step 5, the pre-perforated extending parts of the carriers 15 are aligned with the liquid crystal lens system. In step 6, the electrode layers and carriers are perforated and in step 7, the conductive material is added to the holes. In the embodiment of FIG. 7, the holes are blind holes whereas in the embodiment of FIG. 6, the holes are through holes.

Figure 8:
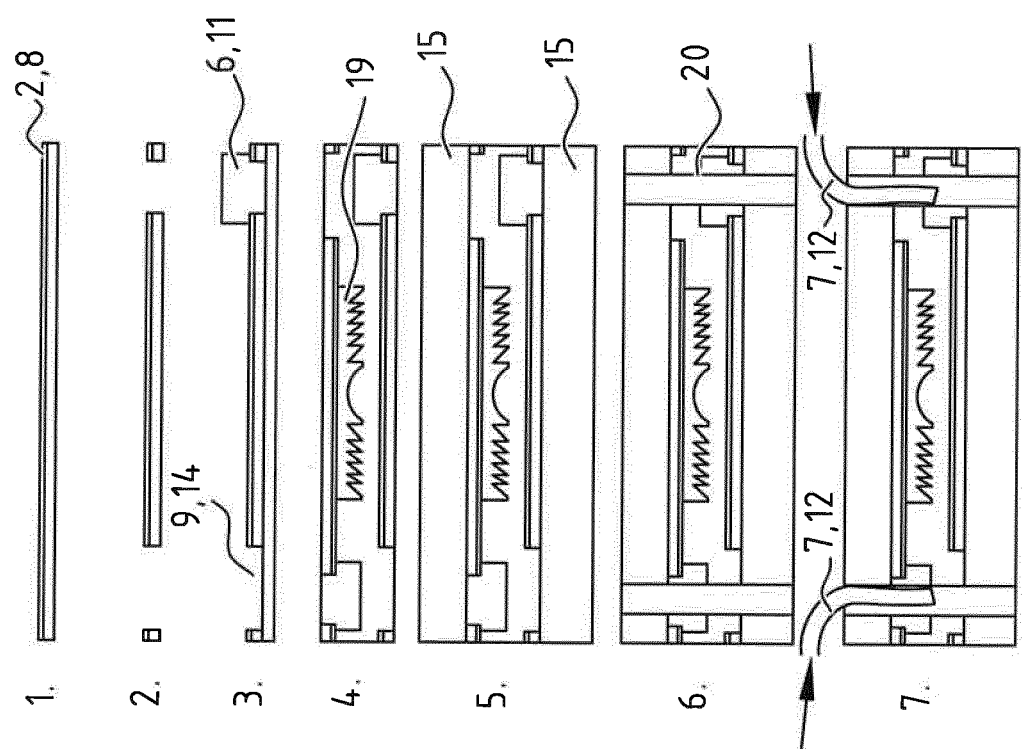

FIG. 8 shows yet another embodiment wherein in step 2, two holes are cut into the electrode layer and carrier. In step 3, a connecting area is printed over one of the holes, particularly over the edges of one of the holes. In step 4, two electrode layers and carriers are assembled into a lens system. In step 5, the assembly is sandwiched between two lens halves, thereby extending the carriers 15. In step 6, holes are created through the conductive layers 6 and in step 7, the conductive material is added.

The different methods of FIGS. 6, 7 and 8 show that the sequence of the steps can be changed without departing from the scope of the invention. The skilled person will realize that these figures only show a limited number of embodiments, and that other sequences might have the same or a similar result.

Figure 9:
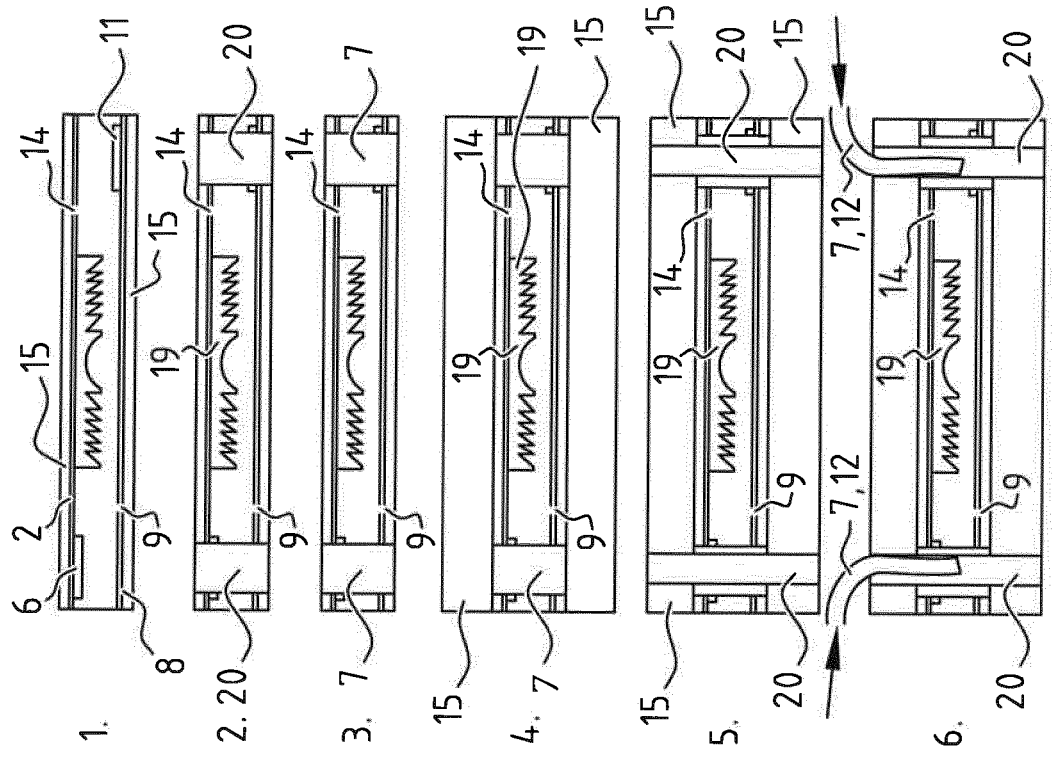

FIG. 9 illustrates another preferred method. Tests have shown that the method of FIG. 9 provides the most reliable electrical connection. In FIG. 9, in a first step, the electrode layers 2, 8 are provided on polymer carriers 15. The electrode layers 2, 8 are provided with respective conducive surfaces 6, 11, and with corresponding interruptions 9, 14. These electrode layers 2, 8 are assembled with a diffractive structure such as Fresnel lens in between, and with liquid crystals in between. By this assembly, a stack is formed that is considered the liquid crystal lens system. This lens system is, due to the polymer carriers 15, flexible and can be integrated into a larger structure such as between lens halves of a pair of glasses.

Before integrating the flexible lens system into a larger structure, the lens system is perforated, as is shown in step 2 of FIG. 9. Step 2 of FIG. 9 shows two holes 20 at the locations of the conductive layers 6, 11. In step 3, these holes are filled with conductive material 7. The conductive material can be applied in liquid form, or can be in the form of a plug. It is not excluded that a center area would remain empty, creating an annular layer of conducting material 7.

In a fourth step, the flexible lens system is integrated into a larger structure. In particular, in step 4, the stack with the filled holes is sandwiched between two transparent bodies, for instance lens halves of a lens of a pair of glasses. These lens halves extend the carriers.

In step 5, the extended carriers are perforated at the location of the conductive material. It is not excluded that at least one of the extended carriers is perforated. Since the applied bodies are transparent, it is visible for an operator or machine where to provide these new perforations. The perforation is filled in step 6 with auxiliary conductive material to establish an external connection with the electrode layers 2, 8. The filling may occur with a plug, in liquid form such as with electrically conductive glue. A basin or well may be created on the outside of the extended carrier 15 for the auxiliary conductive material, so as to connect it to the conductive element, such as a wire or a flexible printed circuit.

Figure 10A:
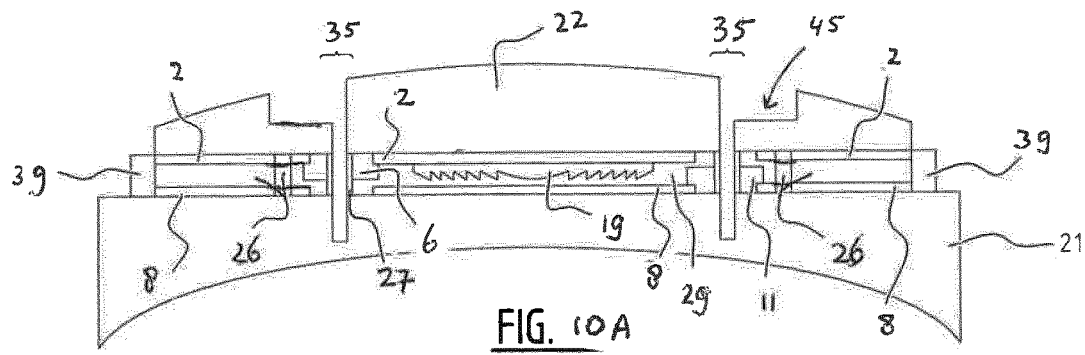
FIGS. 10A, 10B, and 10C illustrate in more detail some steps of FIG. 9 for the connection of the conductive element by means of a vertical connection.
Figure 10B:
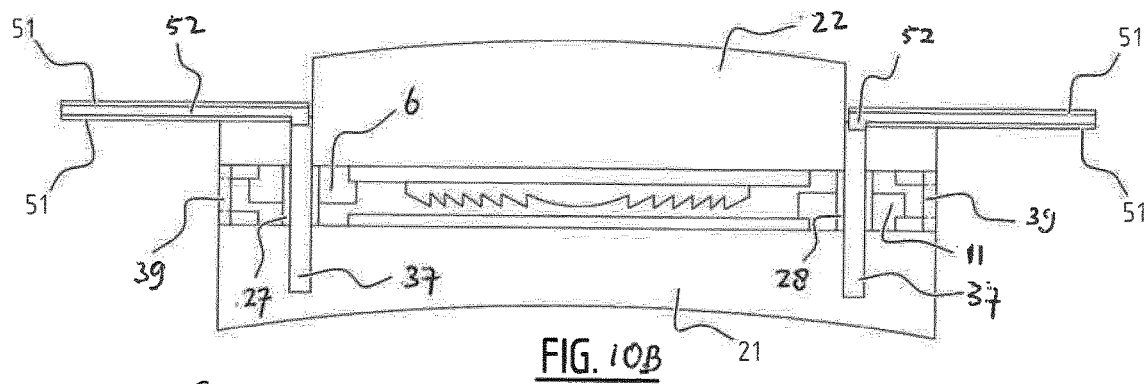
Figure 10C:
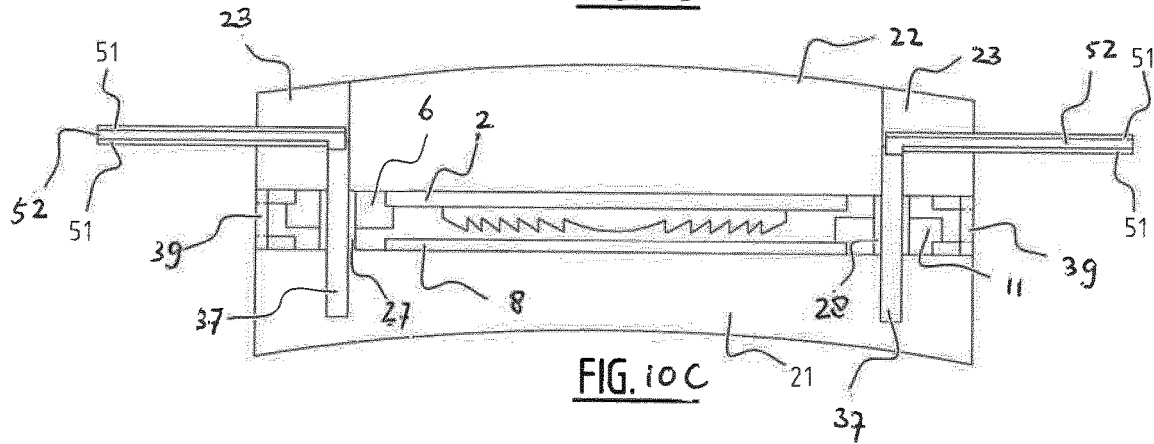

FIG. 10A-C shows the generation of the connection by means of auxiliary conductive material. Starting point hereof is an optical device which is the result of the process shown in FIG. 8, or alternatively the third stage of FIG. 9. This optical device comprises an assembly of a first carrier and a further light transmissive carrier. It is observed that these carriers are not explicitly shown in FIG. 10A. Preferably, the carrier are polymer carriers. The first carrier provided with an electrode layer 2, a conductor layer 6 in the form of one conductor pattern or a plurality of conductor patterns, a Fresnel lens 19, electrically insulating material 26 and liquid crystalline material 29. The further light transmissive carrier is provided with the further electrode layer 8 and the further conductor 11, which may be in the form of a single conductor (as shown in FIG. 10A) or in the form of a plurality of conductor patterns. Perforations have been applied in the connection area and further connection area—not indicated in FIG. 10A), to result in conductive plugs 27, 28.

Thereafter, this adaptive lens system, also referred to as a lens foil is sandwiched between a first and a second transparent body 21, 22. In the illustrated example, said transparent bodies 21, 22 are lens halves according to a predefined lens type, for instance for a pair of glasses or sunglasses. The assembly of the transparent bodies 21, 22 and the lens foil is made by means of gluing. A protective glue layer 39 is provided on the free edges of the lens foil. Clearly, alternative options are available for such protection. The upper transparent body 22 is provided with a cavity 45, configured to contain liquid connecting material, such as liquid adhesive or conductive ink.

Furthermore holes 35 are provided so as to extend through the conductive plugs 27, 28. Typically, the conductive plugs 27, 28 are provided with a diameter of at least 0.3 mm, preferably at least 0.5 mm or even 0.8-1.5 mm, so that it is feasible to provide a hole therein. As shown in this FIG. 10A, it is preferred that the holes 35 do not fully perforate both transparent bodies 21, 22.

FIG. 10B shows the device in a further stage, wherein the holes have been filled with conductive material to result in vertical conductors 37. A conductive element with an insulating layer 51 and an inner conductor 52 is applied to the vertical conductors 37. In the illustrated embodiment, the insulating layer 51 is locally removed and to provide the connection at the tip of the vertical conductor 37. Alternatively, the conductive material may extend in the cavity 45 (as shown in FIG. 10A) and to provide the electrical connection with the conductive element.

FIG. 10C finally shows the device in a further stage of completion, wherein the conductive element and the vertical conductor 37 are protected by means of a cover 23, which is suitably provided in a form corresponding to the form of the transparent body 22.

FIG. 11A-D shows in diagrammatical and cross-sectional view a further embodiment for connecting of a lens foil with conductive plugs 27, 28 to a conductive element. In this illustrated embodiment, the conductive element 50 is applied sidewise—also referred to as laterally. The illustrated embodiment discloses a direction substantially parallel to the electrode layers 2, 28. However, it is not excluded that the connection is made from an oblique angle.

Figure 11A:
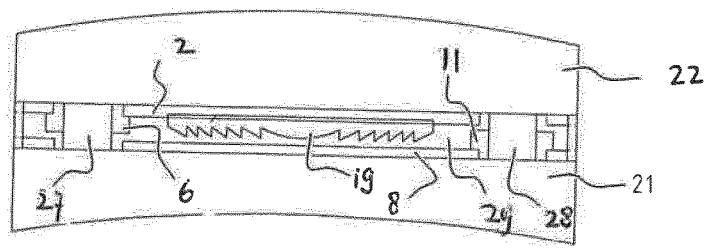
FIGS. 11A, 11B, 11C, and 11D illustrate an embodiment in diagrammatical, cross-sectional view for the connection of the conductive element by means of a horizontal connection.

FIG. 11A shows the situation wherein the lens foil is sandwiched between a first and a second transparent body 21, 22.

Figure 11B:
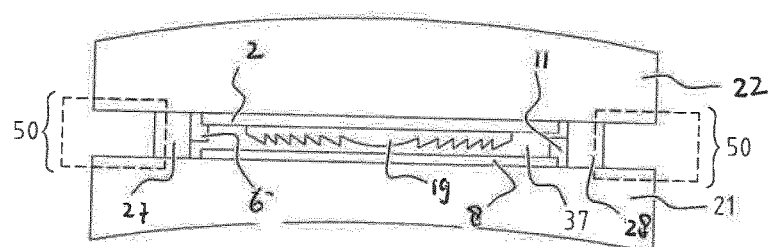

FIG. 11B shows the device after the subsequent stage, wherein material sidewise to the conductive plugs 27, 28 and facing away from the functional area with the Fresnel lens 19 and the liquid crystalline material 29 is removed up to the conductive plus 27, 28. In one implementation, holes 50 are made by means of punching, laser ablation or the like. The provided hole 50 can be of any suitable form, such as cylindrical, cone-shaped, block shaped and the like. Although not shown in the present FIG. 11A-11B, it is feasible that the hole is effectively generated before applying the first and second transparent bodies 21, 22, or after providing only one of the transparent bodies 21, 22.

Figure 11C:
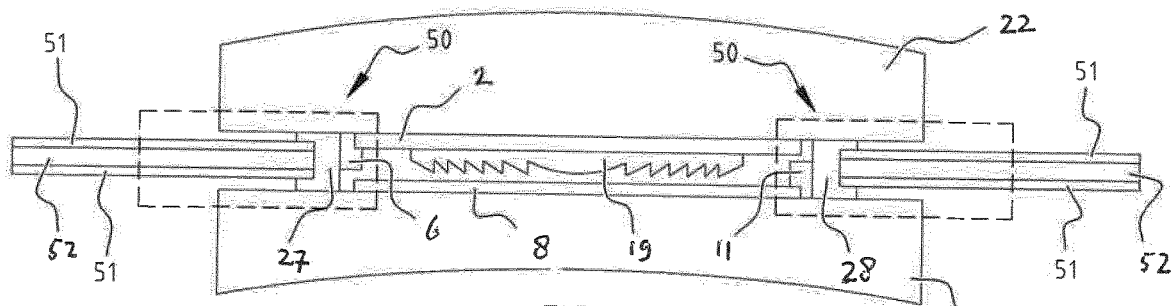

As shown in FIG. 11C, a conductive element is thereafter inserted into the hole 50. Also in this embodiment, it appears preferable to provide an insulated wire or cable comprising an inner conductor 52 and outer insulating layer 51. However, it is not excluded that the conductive element would be a flex foil or even that the hole 50 would be filled up with conductive material, such as a conductive ink, conductive glue or the like up to a terminal. At such terminal, a conductive element could be applied.

Figure 11D:
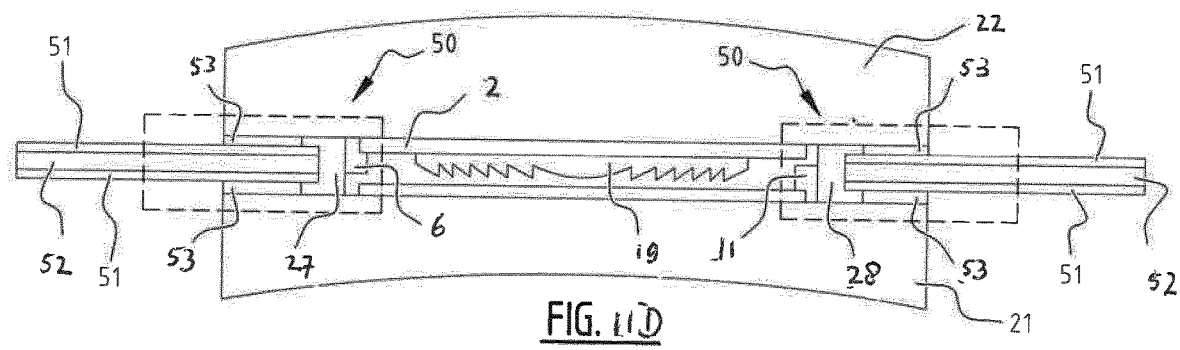
Figure 12:
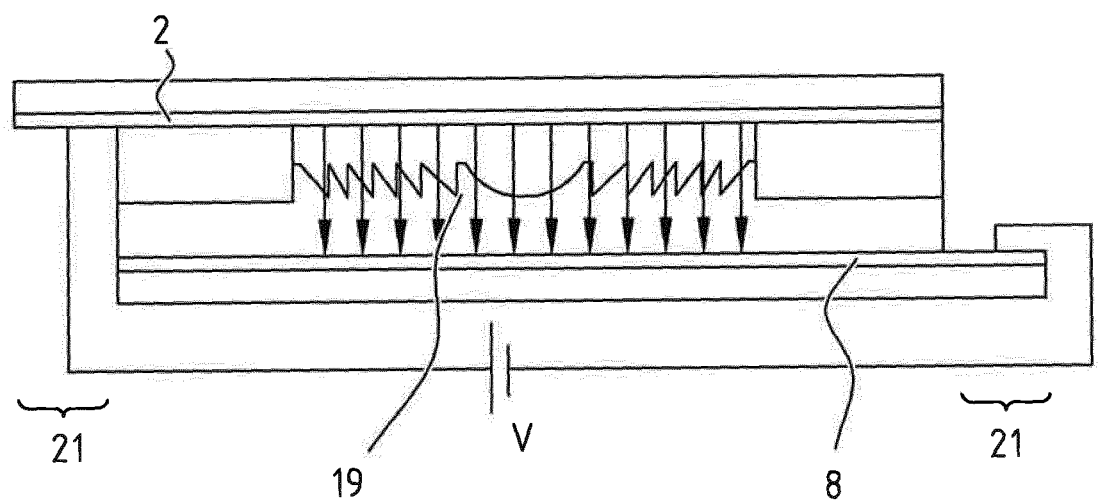
FIG. 12 illustrates a prior art situation.

As shown in FIG. 11D, passivation material 53 is applied between the conductive element and the transparent bodies 21, 22. The passivation material 53 provides protection and fixes the conductive element into the hole 50. It will be understood that the conductive element may be further fixed by mechanical fixations means, such as clips and/or grooves. While not should it is not excluded that some conductive glue is applied between the conductor 52 and the conductive plug 27, 28 to ensure an adequate electrical connection. According to again a further implementation, the material of the conductive plug 27, 28 may be chosen so as to become flowable upon heating. The conductive element can then be pushed into the conductive plug that will solidify subsequently.

While the foregoing figures have shown that a single lens foil has been integrated between a first and a second transparent body 21, 22, it is not excluded that more than one lens foil is integrated, for instance two lens foils. The said two lens foils are preferably arranged so as that the combined stack is polarization independent. This is deemed preferable for conventional glasses. For sun glasses, however, the integration of a single lens foil is deemed preferable, in view of the presence of a polarization filter therein.

Based on the figures and the description, the skilled person will be able to understand the operation and advantages of the invention as well as different embodiments thereof. It is however noted that the description and figures are merely intended for understanding the invention, and not for limiting the invention to certain embodiments or examples used therein. Therefore it is emphasized that the scope of the invention will only be defined in the claims

The invention claimed is:

1. A method for establishing an electrical connection in an optical device between a conductive element and a light transmitting electrode layer carried by a light transmitting carrier, the optical device having a connecting area, wherein the method comprises the steps of:
    applying a conductive layer onto the electrode layer in the connecting area, the conductive layer having a thickness being significantly larger than the thickness of the electrode layer;

perforating the carrier in the connecting area;
perforating the electrode layer in the connecting area;
after applying the conductive layer, perforating the conductive layer in the connecting area, resulting in a perforation extending through the carrier, the electrode layer and the conductive layer, and wherein the method subsequently comprises the step of:
at least partially filling the perforation extending through the carrier, electrode layer and conductive layer with a conductive material and connecting the conductive element to the conductive material thereby establishing an electric connection between the electrode layer and the conductive element via the conductive layer and the conductive material.

2. The method of claim 1, the optical device having a functional area, wherein the optical device comprises at least one further light transmitting electrode layer provided at a distance (d) from the electrode layer, the method further comprising:
providing an electrical interruption in the at least one further electrode layer between the connecting area and the functional area.

3. The method of claim 2, the optical device having a further connecting area, the method comprising for each of the at least one further electrode layer carried by a further light transmitting carrier the further steps:
applying a further conductive layer onto the further electrode layer in the further connecting area, the further conductive layer having a thickness being significantly larger than the thickness of the further electrode layer;
providing a further electrical interruption in the electrode layer between the further connecting area and the functional area;
providing a further perforation, comprising further perforating the carrier in the further connecting area, providing a well or perforation into the further light transmitting carrier in the further connection area, and further perforating the further electrode layer in the further connecting area;
and wherein the method subsequently comprises the step of:
at least partially filling the further perforation with a further conductive material and connecting a further conductive element to the further conductive material thereby establishing an electric connection between the further electrode layer and the further conductive element via the further conductive layer and the further conductive material.

4. The method of claim 1, wherein the method further comprises the step of assembling the carrier, the electrode layer and the conductive layer with a further light transmitting carrier, a further electrode layer on the further light transmitting carrier and one or more intermediate layers on at least one of the carriers, before the provision of the perforation.

5. The method of claim 4, wherein the intermediate layers comprise a Fresnel lens, a liquid crystalline material; and electrically insulating material; wherein the Fresnel lens is provided onto one of the electrode layer and the further electrode layer, wherein the liquid crystalline material is provided between the Fresnel lens and the other of the electrode layers, the Fresnel lens and the liquid crystalline material being present in a functional area, and wherein the electrically insulating material is present laterally adjacent to the Fresnel lens and the liquid crystalline material, which electrically insulating material extends to the connecting area and is perforated while perforating the electrode layers and the conductive layers.

6. The method of claim 4, wherein the method further successively comprises, after the step of assembling, simultaneously perforating the carrier, the electrode layer and the conductive layer in the connecting area.

7. The method of claim 4, wherein the carrier is perforated and/or the further light transmitting carrier is provided with wells or perforations, prior to the assembly, and preferably prior to the application of the respective electrode layer and conductive layer.

8. The method as claimed in claim 1, wherein the step of connecting the conductive element to the conductive material comprises the steps of:
sandwiching the light transmitting carrier, any further light transmitting carrier, one or more electrode layers, conductive layers and intermediate layers between transparent bodies;
providing holes through the transparent bodies, the holes being aligned with filled perforations and having a smaller diameter than a diameter of the perforations; and
applying auxiliary conductive material into the holes and connecting the conductive element to such auxiliary conductive material at an outside of such transparent body.

9. The method as claimed in claim 1, wherein the step of connecting a conductive element to the conductive material comprises the step of providing a hole from a lateral side extending up to the at least partially filled perforation, and providing auxiliary conductive material for connection to the conductive element.

10. An optical device comprising a light transmitting electrode layer provided onto a light transmitting carrier, wherein a conductive layer is provided on the electrode layer, the conductive layer establishing a connecting area, the conductive layer having a thickness being significantly larger than the thickness of the electrode layer, and wherein the electrode layer, carrier and conductive layer show a perforation in the connecting area, the perforation extending through the carrier, the electrode layer and the conductive layer being at least partially filled with a conductive material which is further connected to a conductive element thereby establishing an electrical connection between the electrode layer and the conductive element via the conductive layer and the conductive material.

11. The optical device of claim 10, comprising at least one further light transmitting electrode layer provided at a distance (d) from the electrode layer, the at least one further electrode layer being provided with an electrical interruption between the connecting area and a functional area.

12. The optical device of claim 11, wherein a further conductive layer is provided on the further electrode layer, the further conductive layer establishing a further connecting area, the further conductive layer having a thickness being significantly larger than the thickness of the further electrode layer, and wherein the further electrode layer and carrier show a further perforation in the further connecting area, the further perforation being at least partially filled with a further conductive material which is further connected to a further conductive element thereby establishing a further electrical connection between the further electrode layer and the further conductive element via the further conductive layer and the further conductive material.

13. The optical device according to claim 11, wherein the conductive layer and any further conductive layer, if present, is absent in the functional area and extends parallel to the carrier.

14. The optical device as claimed in claim 10, wherein the conductive layer has a surface area at least twice as large as a cross sectional area of the perforation.

15. The optical device according to claim 10, wherein the conductive layer is provided pattern wise, including a plurality of conductor patterns within the connection area, wherein the plurality of conductor patterns covers a surface area at least three, preferably at least four times as large as a surface area of a perforation.

16. Optical equipment, such as a pair of glasses, comprising the optical device as claimed in claim 10.

* * * * *